(12) United States Patent
Van Lieshout et al.

(10) Patent No.: US 9,860,800 B2
(45) Date of Patent: Jan. 2, 2018

(54) METHOD AND APPARATUS FOR MOBILITY MANAGEMENT

(71) Applicant: Samsung Electronics Co., Ltd., Gyeonggi-do (KR)

(72) Inventors: Gert Jan Van Lieshout, Middlesex (GB); Himke Van Der Velde, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 14/435,142

(22) PCT Filed: Jul. 19, 2013

(86) PCT No.: PCT/KR2013/006497
§ 371 (c)(1),
(2) Date: Apr. 10, 2015

(87) PCT Pub. No.: WO2014/058139
PCT Pub. Date: Apr. 17, 2014

(65) Prior Publication Data
US 2015/0237540 A1    Aug. 20, 2015

(30) Foreign Application Priority Data

Oct. 12, 2012  (GB) .................................. 1218392.7

(51) Int. Cl.
*H04W 36/00* (2009.01)
*H04W 36/08* (2009.01)
*H04W 76/02* (2009.01)
*H04W 88/08* (2009.01)
*H04W 88/16* (2009.01)

(52) U.S. Cl.
CPC ....... *H04W 36/0055* (2013.01); *H04W 36/08* (2013.01); *H04W 76/028* (2013.01); *H04W 88/08* (2013.01); *H04W 88/16* (2013.01)

(58) Field of Classification Search
CPC ............. H04W 36/0055; H04W 36/08; H04W 76/028; H04W 88/08; H04W 88/16
USPC ............ 455/404.2, 412.1–414.2, 418–422.1, 455/435.1–453, 456.1, 552.1; 370/328–332, 338, 341
See application file for complete search history.

(56) References Cited

U.S. PATENT DOCUMENTS 7,933,598 B1 * 4/2011 Agrawal ........... H04W 36/0022
                                                370/310
8,054,806 B2   11/2011 Aydin et al.
(Continued)

FOREIGN PATENT DOCUMENTS

| AU | 2012202096 A1 | 5/2012 |
| EP | 202610 A1 | 2/2009 |

(Continued)

OTHER PUBLICATIONS

Combined Search and Examination Report Under Sections 17 & 18(3) dated Feb. 20, 2013 in connection with UK Application No. GB1218392.7; 7 pages.

(Continued)

*Primary Examiner* — Babar Sarwar

(57) ABSTRACT

A method of operating a target base station in a wireless communication network to determine an addressing information for a source base station.

21 Claims, 11 Drawing Sheets

(56) References Cited

U.S. PATENT DOCUMENTS

| | | | |
|---|---|---|---|
| 2006/0258330 A1* | 11/2006 | Guedalia | H04L 12/66 455/405 |
| 2009/0046578 A1 | 2/2009 | Aydin et al. | |
| 2009/0316655 A1 | 12/2009 | Prakash et al. | |
| 2010/0124173 A1 | 5/2010 | Agashe et al. | |
| 2010/0260142 A1* | 10/2010 | Jung | H04W 36/0077 370/331 |
| 2011/0216732 A1* | 9/2011 | Maeda | H04W 4/08 370/329 |
| 2011/0287773 A1* | 11/2011 | Huang | H04W 12/04 455/450 |
| 2012/0020231 A1* | 1/2012 | Chen | H04W 36/08 370/252 |
| 2013/0143573 A1 | 6/2013 | Basu Mallick et al. | |
| 2013/0182555 A1 | 7/2013 | Raaf et al. | |
| 2014/0024371 A1 | 1/2014 | Lair | |
| 2014/0071891 A1 | 3/2014 | Zhou et al. | |
| 2015/0237540 A1 | 8/2015 | Van Lieshout et al. | |

FOREIGN PATENT DOCUMENTS

| | | |
|---|---|---|
| EP | 2387270 A1 | 11/2011 |
| GB | 2455610 A | 6/2009 |
| GB | 2489725 A | 10/2012 |
| WO | WO 2009/065063 A2 | 5/2009 |
| WO | WO 2012/023784 A2 | 2/2012 |
| WO | WO 2014/043579 A2 | 3/2014 |
| WO | WO 2014/058139 A1 | 4/2014 |

OTHER PUBLICATIONS

Combined Search and Examination Report Under Sections 17 & 18(3) dated Nov. 12, 2014 in connection with UK Application No. GB1218392.7; 2 pages.

International Search Report dated Oct. 31, 2013 in connection with International Patent Application No. PCT/KR2013/006497, 3 pages.

Written Opinion of International Searching Authority dated Oct. 31, 2013 in connection with International Patent Application No. PCT/KR2013/006497, 8 pages.

3GPP TS 36.423 V9.4.0, 3rd Generation Partnership Project; Technical Specification Group Radio Access Network; Evolved Universal Terrestrial Radio Access Network (E-UTRAN); X2 Application Protocol (X2AP), (Release 9), Sep. 2010, 121 pages.

* cited by examiner

[Fig. 1a]
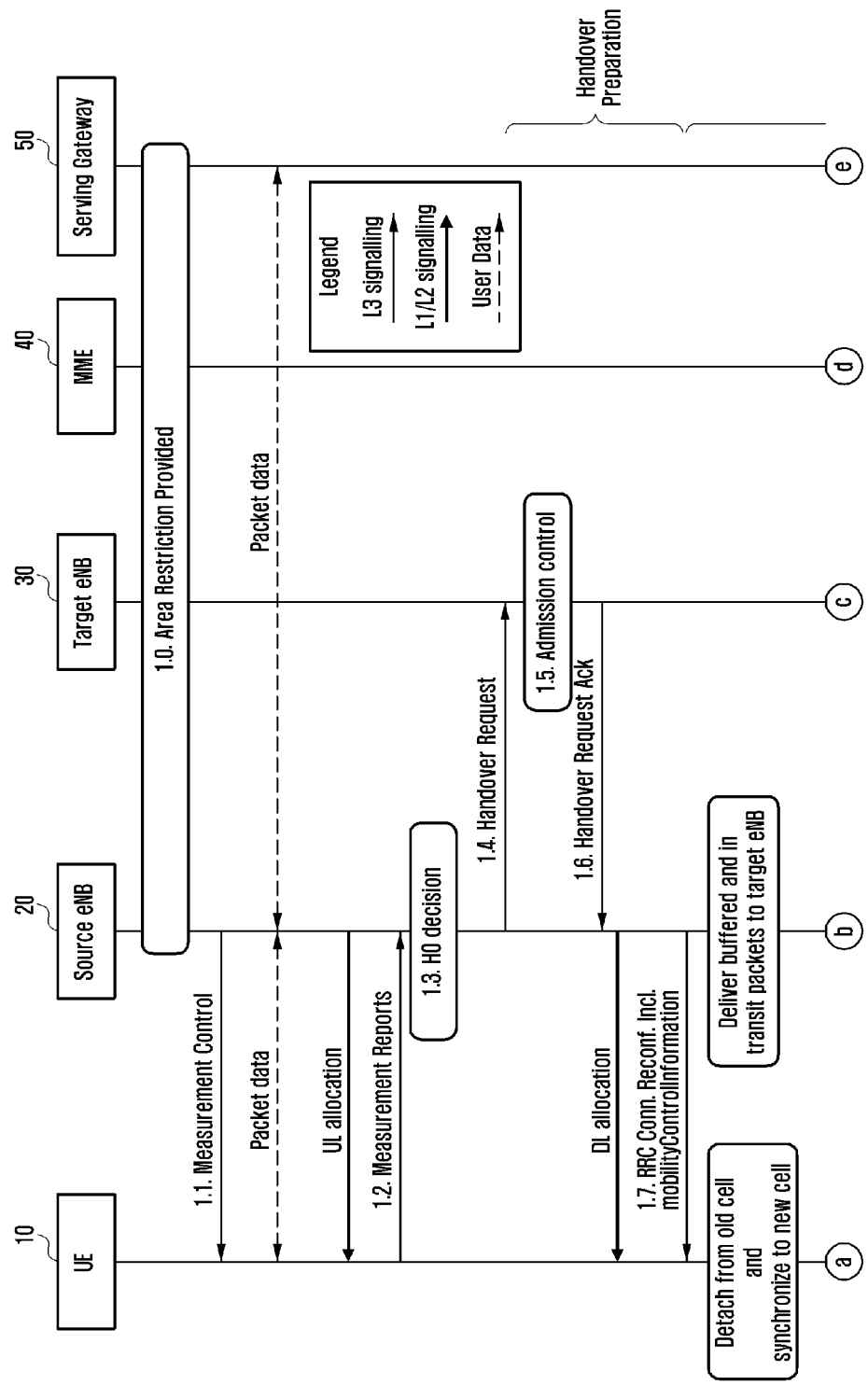

[Fig. 1b]
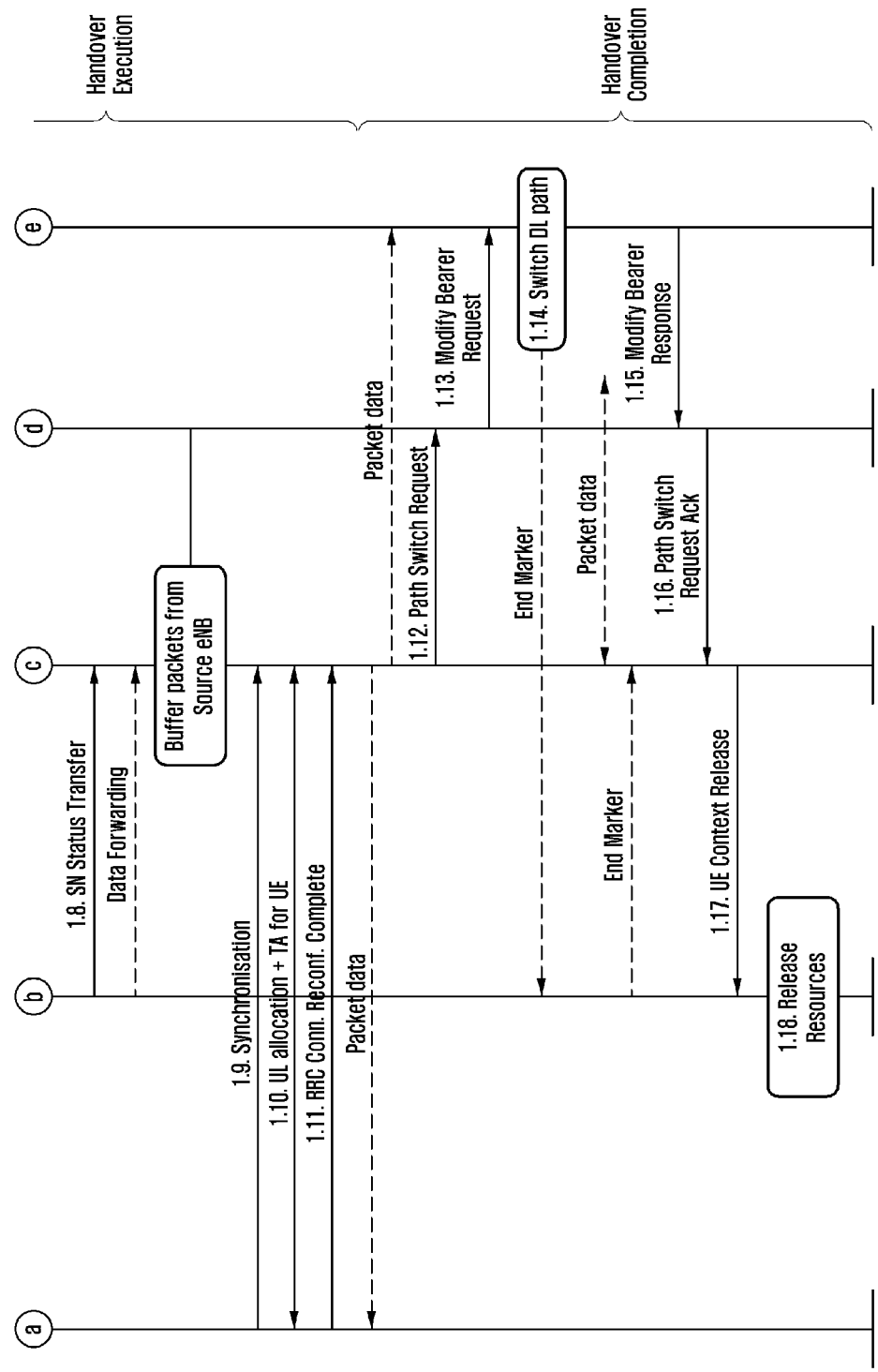

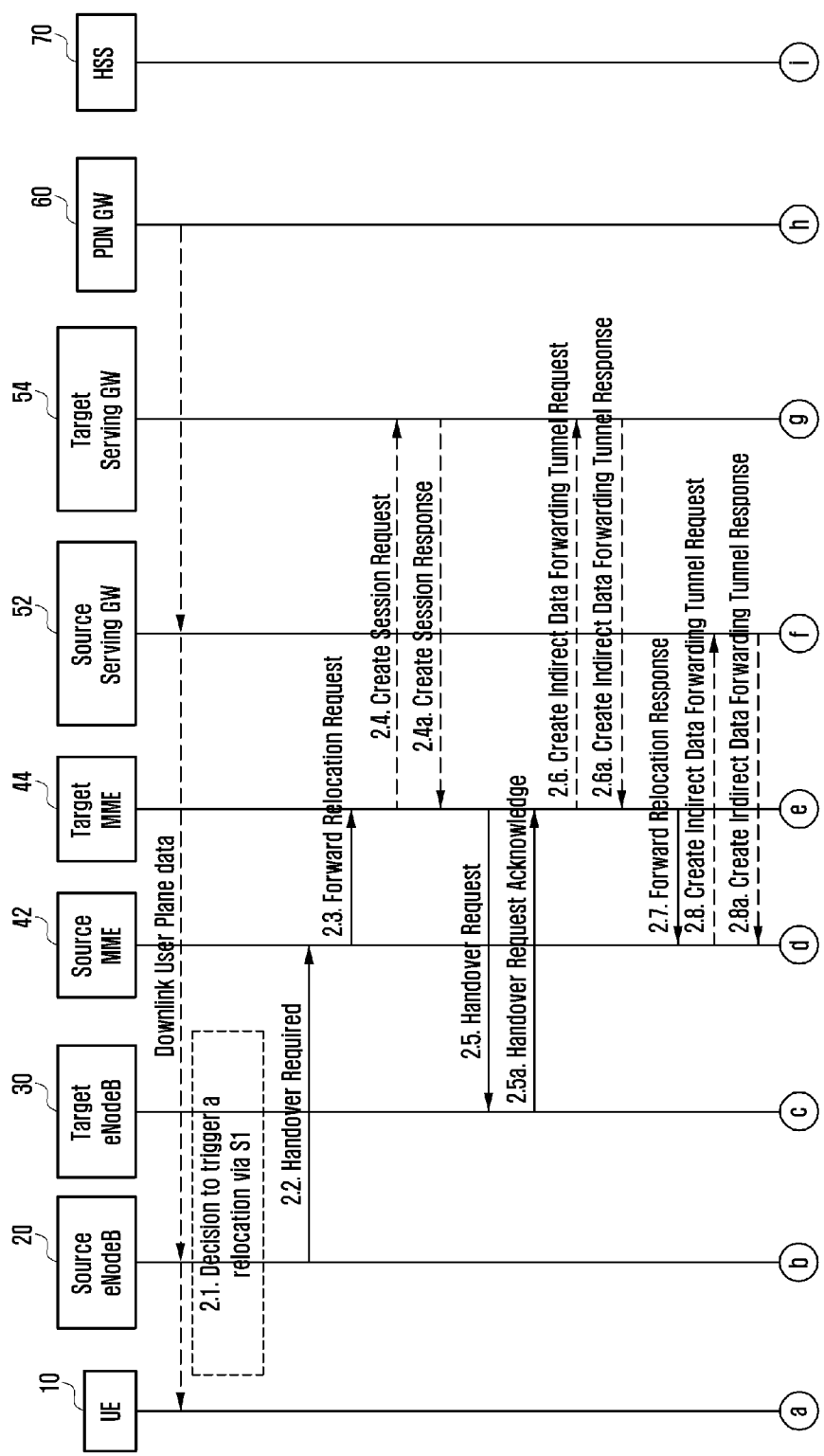
[Fig. 2a]

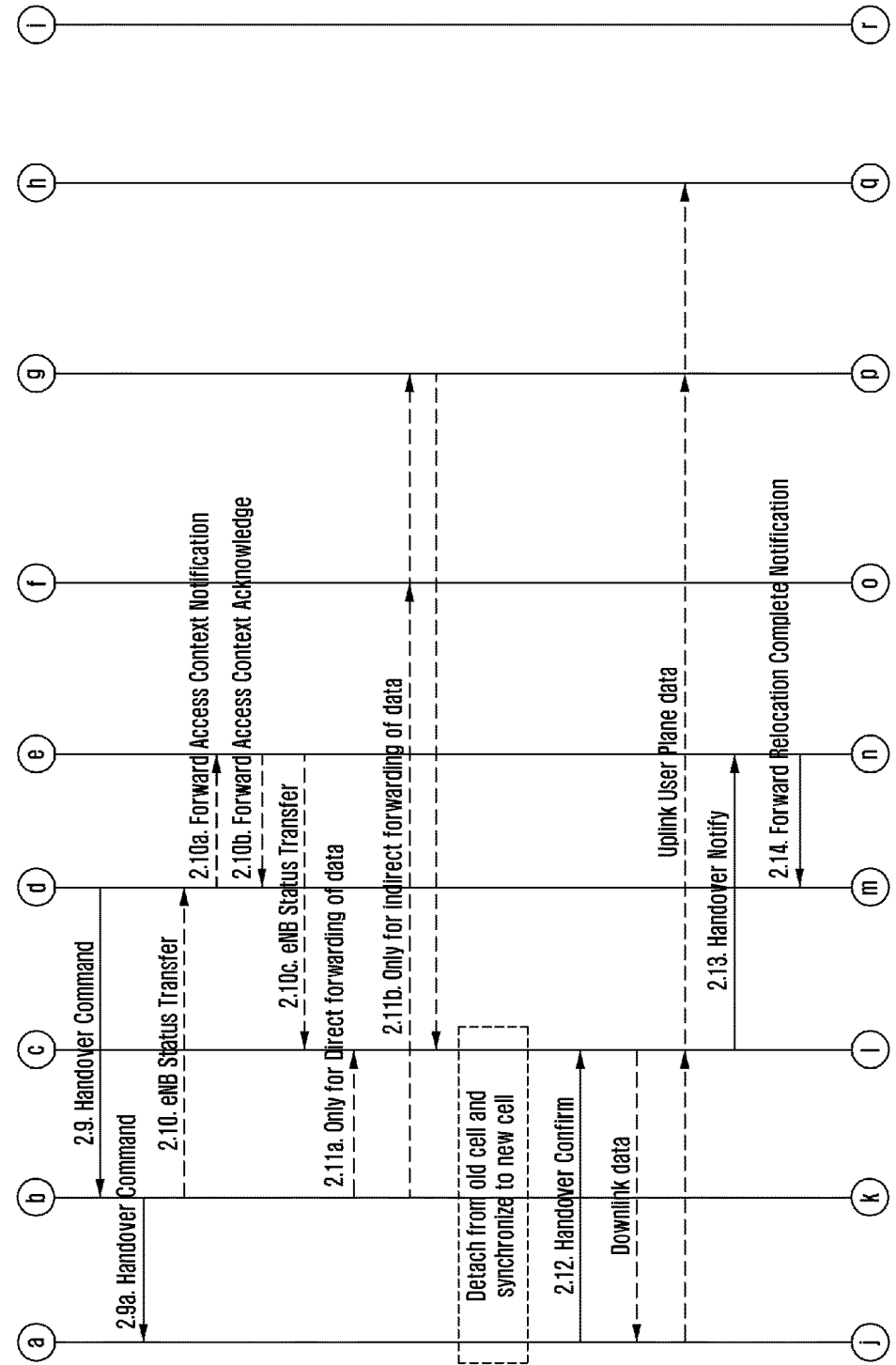
[Fig. 2b]

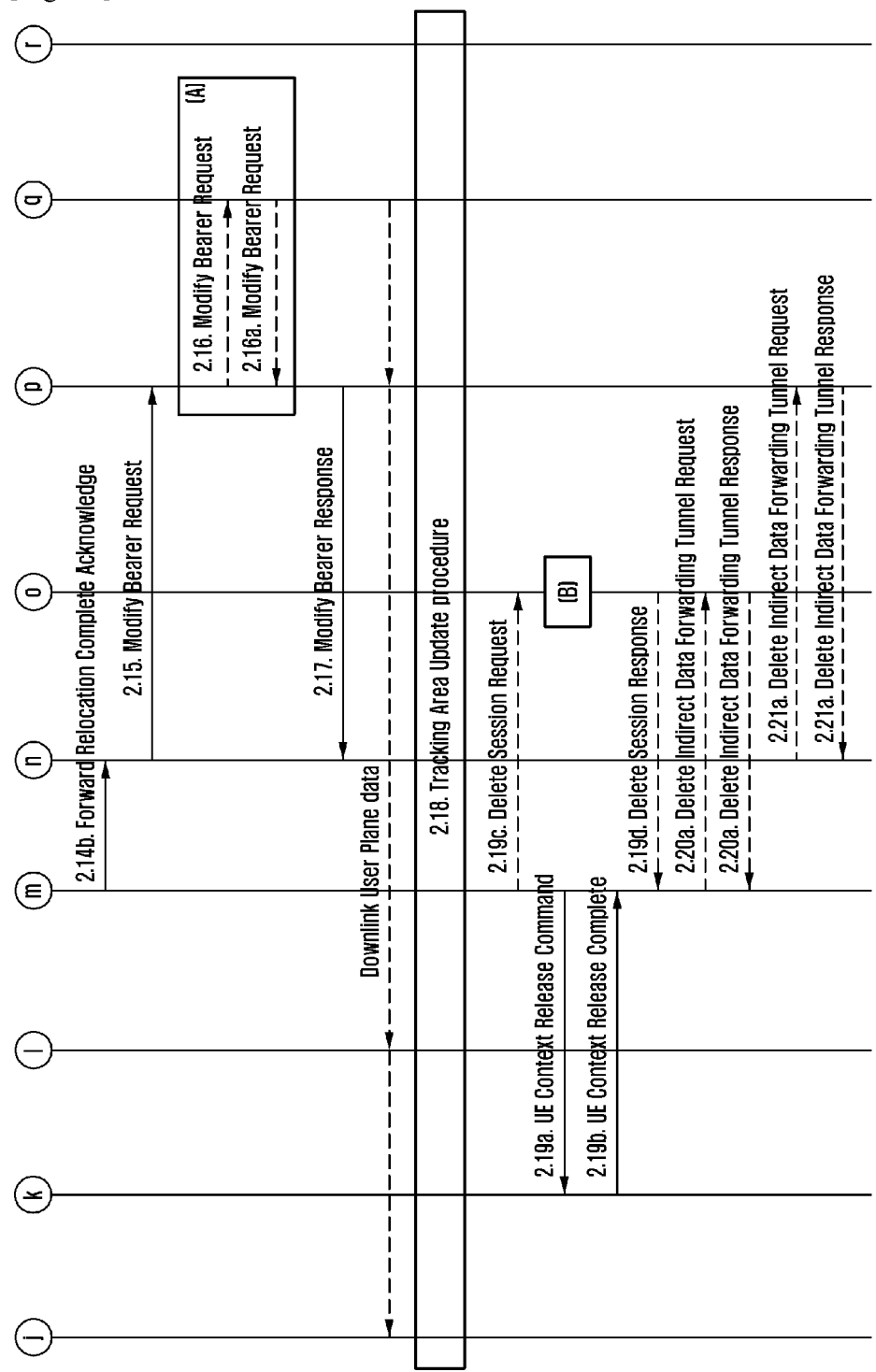

[Fig. 3]
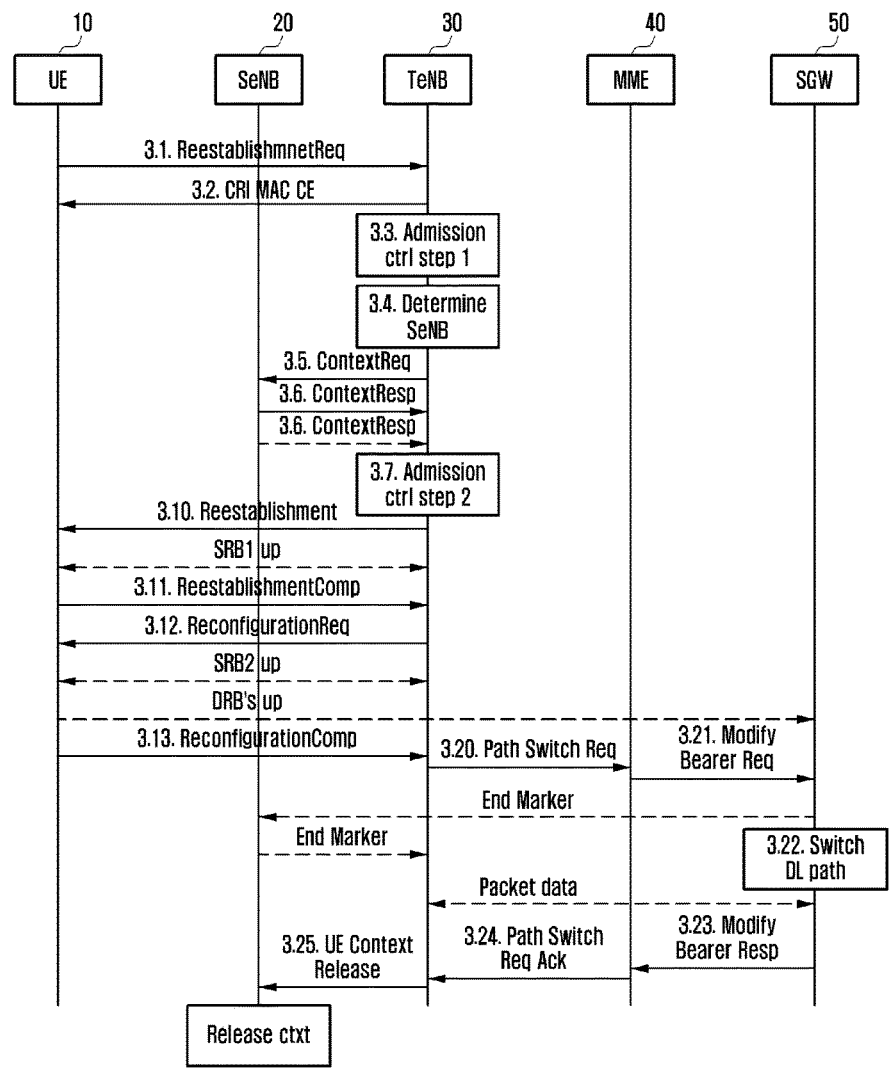
[Fig. 4]
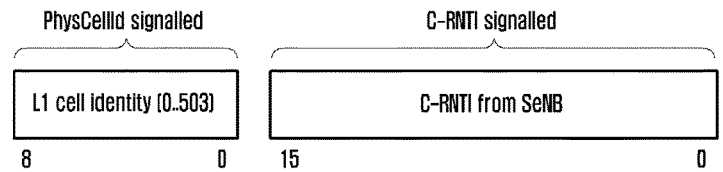
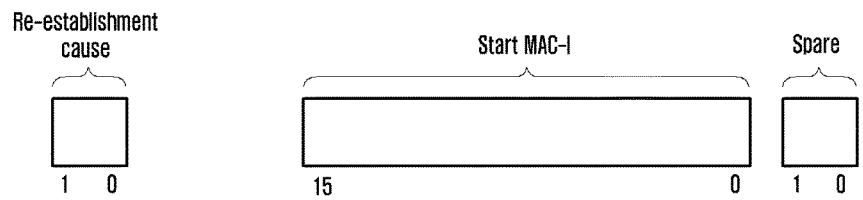

[Fig. 5]
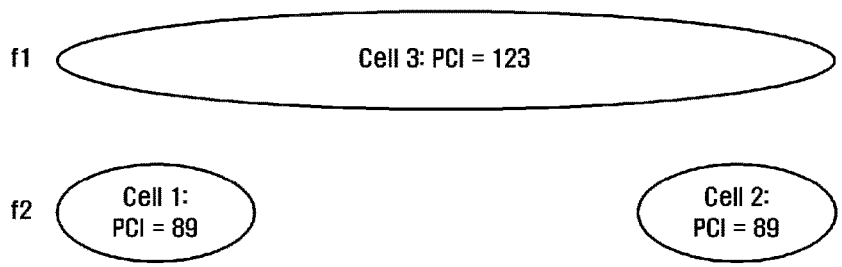
[Fig. 6]
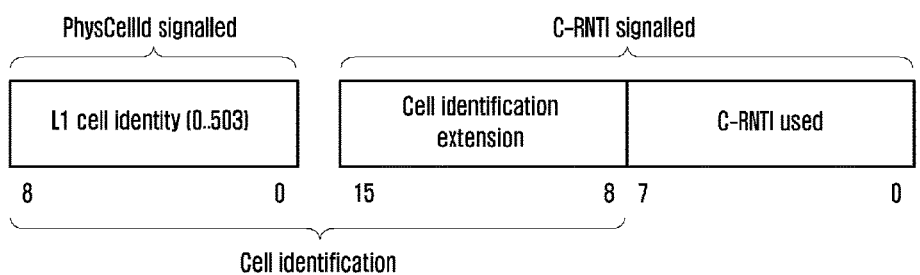
[Fig. 7]
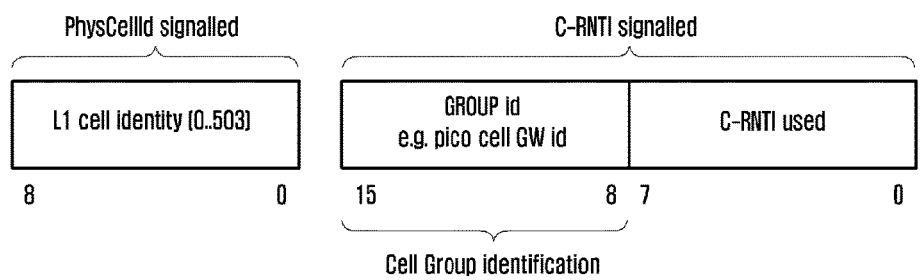

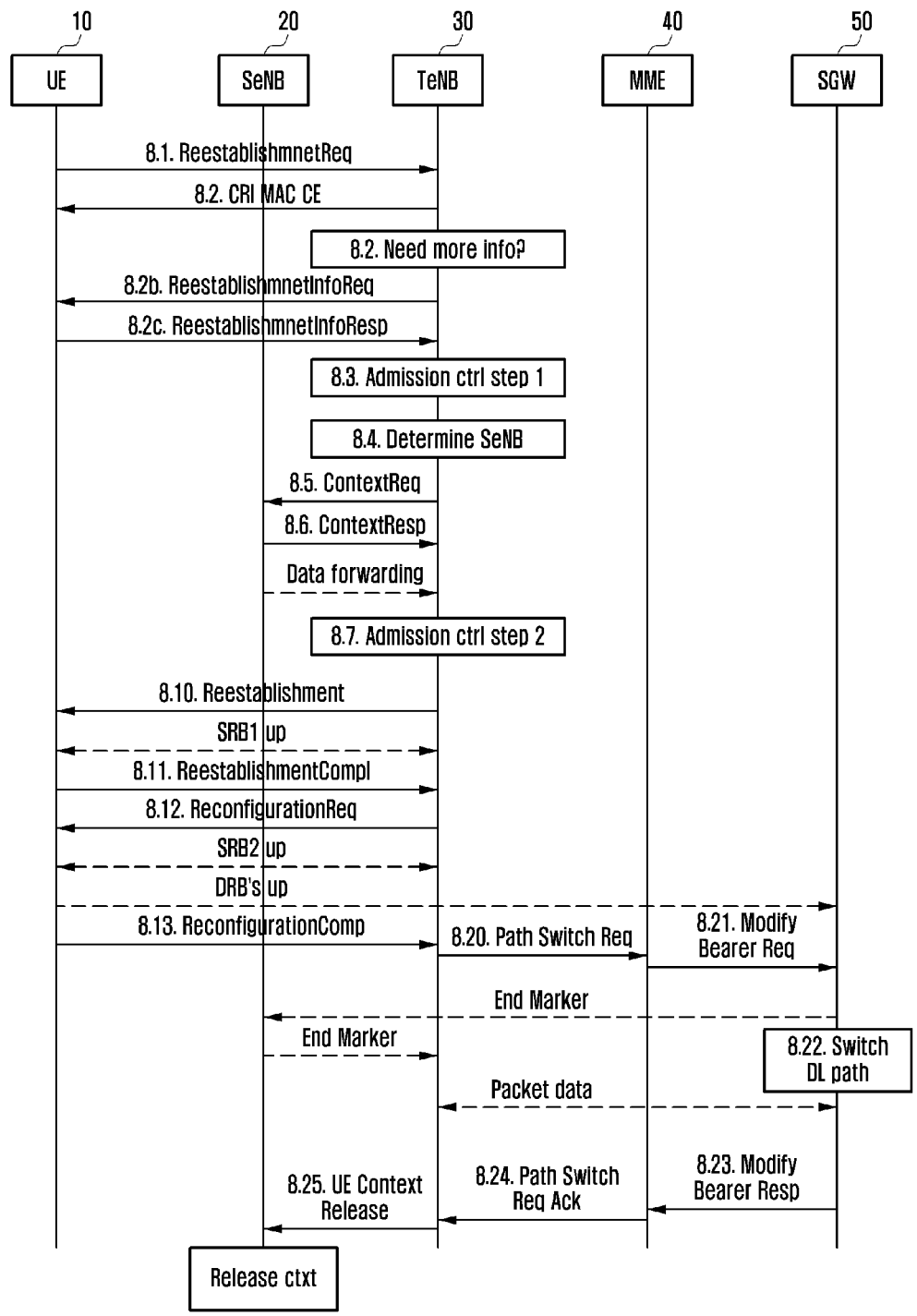

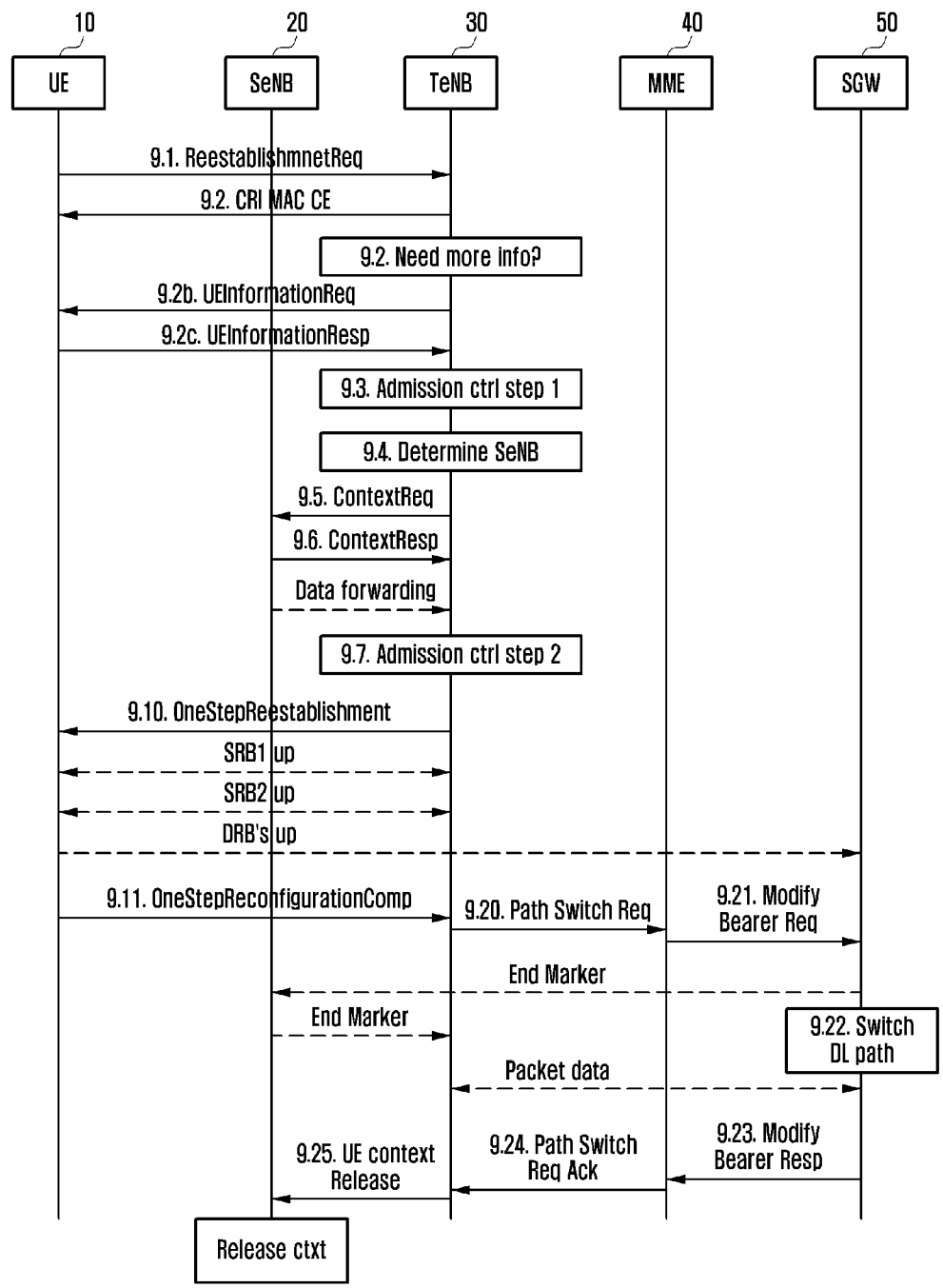

[Fig. 10]
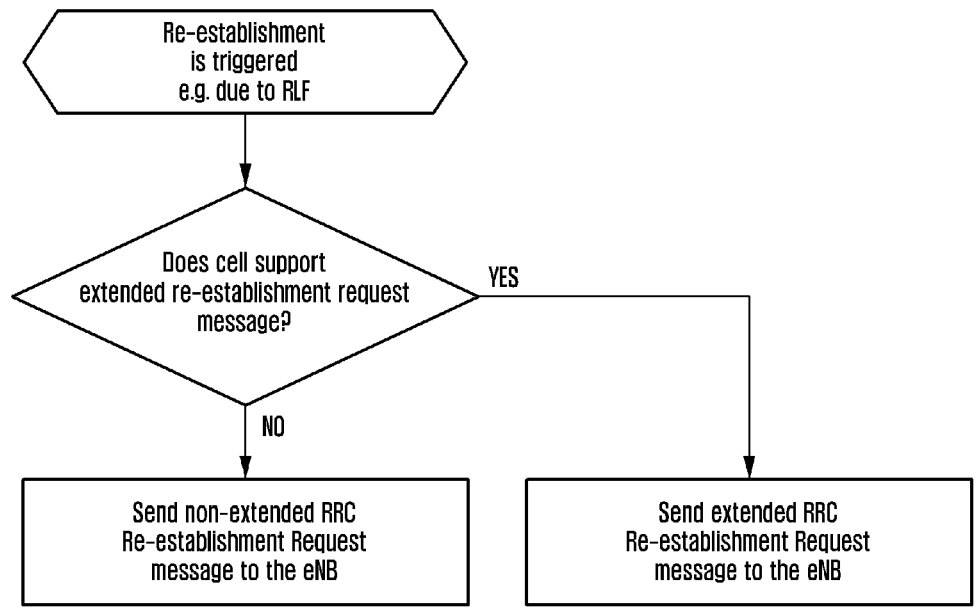
[Fig. 11]
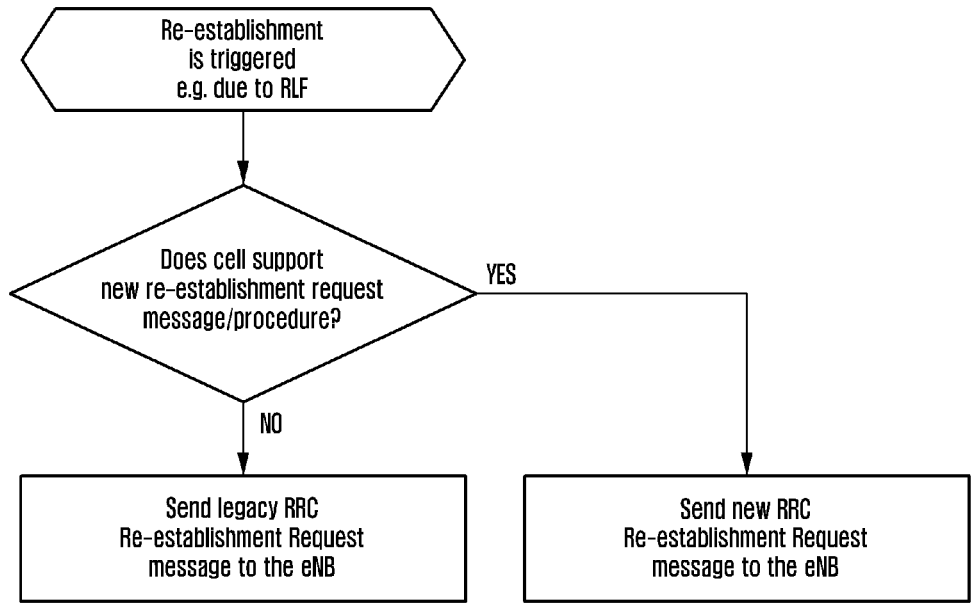

[Fig. 12]
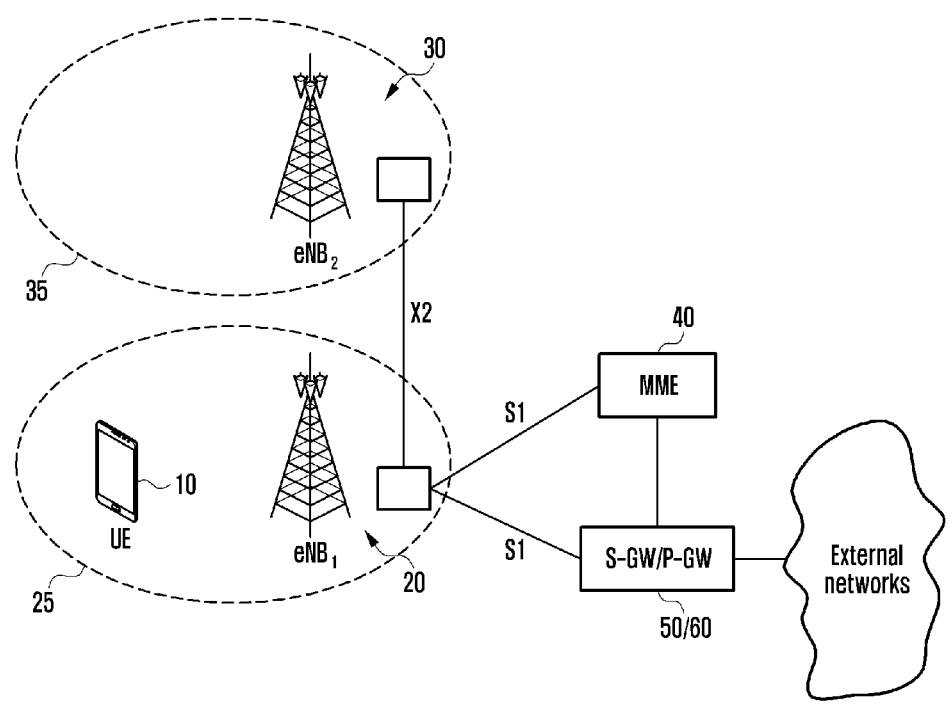

METHOD AND APPARATUS FOR MOBILITY MANAGEMENT

CROSS-REFERENCE TO RELATED APPLICATION(S)

The present application claims priority under 35 U.S.C. §365 to International Patent Application No. PCT/KR2013/006497 filed Jul. 19, 2013, entitled "METHOD AND APPARATUS FOR MOBILITY MANAGEMENT", and, through International Patent Application No. PCT/KR2013/006497, to British Patent Application No. 1218392.7 filed Oct. 12, 2012, each of which are incorporated herein by reference into the present disclosure as if fully set forth herein.

TECHNICAL FIELD

The present invention relates generally to wireless networks, and more specifically to re-establishing connections between user equipment and base stations in a wireless network.

BACKGROUND ART

Wireless mobile networks, in which a user equipment (UE) such as a mobile handset communicates via wireless links to a network of base stations or other wireless access points connected to a telecommunications network, have undergone rapid development through a number of generations. The initial deployment of systems using analogue signalling has been superseded by second generation (2G) digital systems such as GSM (Global System for Mobile communications), which typically use a radio access technology known as GERA (GSM Enhanced Data rates for GSM Evolution Radio Access), combined with an improved core network.

The second generation systems have themselves been replaced by or augmented by third generation (3G) digital systems such as UMTS (Universal Mobile Telecommunications System), using the UTRA (Universal Terrestrial Radio Access) radio access technology and a similar core network to GSM. Third generation standards provide for a greater throughput of data than is provided by second generation systems, and this trend is continued with the proposals by the Third Generation Partnership Project (3GPP) of a new 4G system known as the evolved packet system (EPS) but more commonly referred to as the Long Term Evolution (LTE) system. LTE systems use an improved radio access technology known as E-UTRA (Evolved UTRA), which offers potentially greater capacity and additional features compared with the previous standards, combined with an improved core network technology referred to as the evolved packet core (EPC).

Note that the term "GERA" is used herein to refer to the radio access technology associated with GERAN (GERA networks), "UTRA" is used to refer to the radio access technology associated with UTRAN (UTRA networks), and similarly the term "E-UTRA" is used to refer to the radio access technology associated with E-UTRAN (E-UTRA networks).

As in earlier wireless mobile standards, LTE is designed as a cellular system in which base stations, known as eNBs, provide coverage over one or more cells. A mobile terminal in LTE, known as the user equipment (UE), communicates with just one base station and one cell at a time. The mobile terminal can exist in one of two communication states in LTE: an IDLE state in which the mobile terminal is basically on standby, and a CONNECTED state in which the mobile terminal is active.

In the IDLE state in LTE, the mobile terminal is tracked by the network to a specific tracking area, which may cover several base stations. The mobile terminal is not assigned to any particular base station but may itself choose which base station or base stations it listens to. The main aim in this state is to minimise signalling and resources, and thereby maximise standby time for terminals with limited battery power.

In contrast, in the CONNECTED state in LTE, the mobile terminal has a serving base station allocated to it, has its location tracked to the serving base station, and has active bearers which allow the terminal to transmit and receive at relatively high data rates. Accordingly, the terminal is actively managed by the network as it moves across a tracking area or beyond. Handover is the normal mobility mechanism in the CONNECTED state, and handles the smooth, planned transition of the terminal's connections as the terminal moves from one cell to another, and from one serving base station to another.

In LTE, the Handover mechanism is only available when the terminal is in the CONNECTED state. In the IDLE state, the terminal is free to move within the tracking area and so follows a less rigorous Cell Reselection mobility mechanism.

The Handover mechanism in LTE is managed by the network. That is, the network side determines, based on measurement data received from the user equipment, which destination cell and associated destination base station the user equipment should connect to as it moves out of range of the serving base station. From the point of view of the terminal in a Handover, the destination base station is often referred to as the target base station, while the serving base station the terminal is moving away from is referred to as the source base station.

In general, the Handover sequence involves the source base station or node initially deciding that a handover should occur, and to which target base station. The source base station then prepares the target base station for the handover by providing relevant connection information associated with the specific user equipment. Once prepared, the target base station acknowledges this to the source base station, and the source base station commands the user equipment to handover to the target base station. In response, the user equipment detaches from the source base station, and synchronises to the designated new target cell.

If a failure occurs in the mobility mechanism in the CONNECTED state, the terminal can lose its tight allocation to a serving base station. In this situation, there is a risk that the terminal may have to return to the IDLE state with an associated disruption to the data connections and potential data loss. This disruption of the connection to the source base station may be the result of a Radio Link Failure (RLF).

In order to improve the robustness of the terminal CONNECTED state, the LTE system prescribes a second mobility mechanism known as Re-establishment. Re-establishment is designed to maintain the CONNECTED state, and avoid unintended returns to the IDLE state. The Re-establishment mechanism is used to recover from several error situations in which the network failed to execute a handover in time. The Re-establishment mechanism allows a user equipment that has lost its connection with a serving base station (and has not been commanded to Handover) to reconnect to a potential target base station. A precondition for the Re-establishment to be successful is that the target base station is aware of the connection settings from the previously disrupted connection i.e. the target base station has information on the so-called UE context.

However, if there is an error in the Handover mechanism, then there is a high likelihood that the target base station will not be prepared, and will not have the relevant up-to-date connection information for the terminal to recover while in the CONNECTED state. This limits the effectiveness of the Re-establishment mechanism.

One conceivable solution to this limitation is to prepare one or more neighbouring base stations in anticipation of any potential radio link failure. However, this is difficult to achieve without creating significant additional signalling within the E-UTRAN. The number of base stations that would need to be prepared could be significant depending on the size and topography of the cells, and those base stations that are prepared are likely to need constant updating to ensure the UE context information is up-to-date.

DISCLOSURE OF INVENTION

Technical Problem

There is a need of a technique to improve the robustness of the terminal connected state.

Solution to Problem

In accordance with a first aspect of the present invention, there is provided a method of operating a target base station in a wireless communication network to re-establish a connection with a mobile terminal, the mobile terminal having an earlier disrupted connection with a source base station of the mobile communication network, and the source base station containing configuration information associated with the disrupted connection, the method comprising: receiving a connection request from the mobile terminal to the target base station comprising a cell identifier for a cell served by the source base station, and a connected equipment identifier for the mobile terminal, processing the connection request to determine an addressing information for the source base station using information contained in both the cell identifier and the connected equipment identifier, and sending a request for the configuration information to the source base station using the determined addressing information.

An advantage of re-establishing a connection in accordance with the first aspect of the invention is that the source base station can be more precisely identified. This, in turn, increases the chances of receiving accurate and relevant configuration information at the target base station for building up the connection with the mobile terminal according to a re-establishment mechanism.

In an embodiment of the invention, the connected equipment identifier contains information which can be added to the cell identifier to provide a more specific identification of the cell served by the source base station. Because the identification of the cell is more specific, the target base station is less likely to request the configuration information erroneously from another base station serving a cell with the same cell identifier as the source base station.

In an embodiment of the invention, the connected equipment identifier contains information identifying a group of cells, whereby the group of cells includes the cell served by the source base station. Preferably, the addressing information comprises routing information to the group of cells. By providing routing information to a group of cells, the request for configuration information can be directed to a specific part of the network where the cell identifier is more likely to be unique to a specific cell. The specific part of the network may, for example, be a network entity associated with the group of cells, and the routing information would then enable the configuration information request to be sent via that network entity. Possible network entities include a pico-cell gateway or a home base station gateway.

In an embodiment of the invention, the connected equipment identifier comprises a first subset of information for assisting with uniquely identifying the cell served by the source base station, and a second subset of information for assisting with uniquely identifying the mobile terminal served by the source base station. The connected equipment identifier may be a data field with a predetermined number of bits, and the first subset of information may be one or more bits of the data field.

Preferably, the number of bits used for the first subset of information is configured consistently across a plurality of cells. This has the advantage that the target base station can process the first subset of information in the same way in relation to mobile terminals originating from a plurality of source base stations. The source base stations can be configured to use the same number of bits by means of network interfaces connecting the multiple base stations. For example, the network interfaces could be direct interfaces between neighbouring cells. Alternatively, the network interfaces used to configure the number of bits could be implemented via a network element in the core network.

Suitably, the cell identifier of the source base station is a physical cell identifier (PCI).

Typically, the earlier disrupted connection is a connection which has experienced a radio link failure.

In accordance with a second aspect of the present invention, there is provided a method of re-establishing a connection between a mobile terminal and a target base station, the mobile terminal having an earlier disrupted connection in a cell served by a source base station, and the source base station containing configuration information associated with the disrupted connection, the method comprising: sending a connection request from the mobile terminal to the target base station comprising a cell identifier for a cell served by the source base station, and a connected equipment identifier for the mobile terminal, processing the connection request in the target base station to determine addressing information for the source base station using information contained in both the cell identifier and the connected equipment identifier, and sending a request for the configuration information from the target base station to the source base station using the determined addressing information.

In accordance with a third aspect of the present invention, there is provided a method of allocating connected equipment identifiers for mobile terminals in a wireless communication network, wherein the network allocates a first set of connected equipment identifiers for assignment to mobile terminals operating in a first serving cell in the network, and a second set of connected equipment identifiers for assignment to mobile terminals operating in a second serving cell of the network.

An advantage with allocating different sets of connected equipment identifiers with different cells in the network, is that, connected equipment identifiers can then be used to assist later with identifying the cell to which they are allocated. For example, in a connection re-establishment procedure, a target base station receiving information from a mobile terminal about a previous connected equipment identifier can associate the set to which connected equipment identifier belongs to a particular source base station. Hence, the source base station can be more reliably identified.

In an embodiment of the invention, a mobile terminal that has been assigned a connected equipment identifier in the first or second serving cell, may send a connection re-establishment request to a target base station in a third serving cell, and the target base station may determine which of the first or second serving cells assigned the connected equipment identifier based on whether the connected equipment identifier belongs to the first or second set of connected equipment identifiers.

In accordance with a fourth aspect of the present invention, there is provided a base station for operating in a wireless communication network for re-establishing connections with a mobile terminal as a target base station wherein the mobile terminal has an earlier disrupted connection with a source base station of the mobile communication network, and the source base station containing configuration information associated with the disrupted connection, the target base station being arranged to: receive a connection request from a mobile terminal comprising a cell identifier for a cell served by the source base station, and a connected equipment identifier for the mobile terminal, process the connection request to determine an addressing information for the source base station using information contained in both the cell identifier and the connected equipment identifier, and send a request for the configuration information to the source base station using the determined addressing information.

In accordance with a fifth aspect of the present invention, there is provided a method of establishing a connection between a mobile terminal and a target base station, the mobile terminal having an earlier disrupted connection in a cell served by a source base station, and the source base station containing configuration information associated with the disrupted connection, the method comprising: sending a connection request from the mobile terminal to the target base station comprising a cell identifier for a cell served by the source base station, a connected equipment identifier for the mobile terminal, and supplemental cell identifier information, processing the connection request in the target base station to add the supplemental cell identifier information to the cell identifier to provide a more specific identification of the cell served by the source base station, in order to determine more accurate addressing information for the source base station, and sending a request for the configuration information from the target base station to the source base station using the determined addressing information.

In accordance with a sixth aspect of the present invention, there is provided a method of establishing a connection between a mobile terminal and a target base station, the mobile terminal having an earlier disrupted connection in a cell served by a source base station, and the source base station containing configuration information associated with the disrupted connection, the method comprising: sending a connection request from the mobile terminal to the target base station comprising a cell identifier for a cell served by the source base station, a connected equipment identifier for the mobile terminal, and supplemental routing information for identifying a group of cells including the cell served by the source base station, processing the connection request in the target base station to determine addressing information for the source base station using information contained in both the cell identifier and the supplemental routing information, and sending a request for the configuration information from the target base station to the source base station using the determined addressing information.

In accordance with a seventh aspect of the present invention, there is provided a method of operating a target base station in a wireless communication network to re-establish a connection between a mobile terminal and a target base station, the mobile terminal having an earlier disrupted connection in a cell served by a source base station, and the source base station containing configuration information associated with the disrupted connection, the method comprising: receiving a connection request from the mobile terminal comprising a cell identifier for a cell served by the source base station, a connected equipment identifier for the mobile terminal, and supplemental cell identifier information, processing the connection request in the target base station to add the supplemental cell identifier information to the cell identifier to provide a more specific identification of the cell served by the source base station, in order to determine more accurate addressing information for the source base station, and sending a request for the configuration information from the target base station to the source base station using the determined addressing information.

In accordance with an eighth aspect of the present invention, there is provided a method of operating a target base station in a wireless communication network to re-establish a connection between a mobile terminal and a target base station, the mobile terminal having an earlier disrupted connection in a cell served by a source base station, and the source base station containing configuration information associated with the disrupted connection, the method comprising: receiving a connection request from the mobile terminal comprising a cell identifier for a cell served by the source base station, a connected equipment identifier for the mobile terminal, and supplemental routing information for identifying a group of cells including the cell served by the source base station, processing the connection request in the target base station to determine addressing information for the source base station using information contained in both the cell identifier and the supplemental routing information, and sending a request for the configuration information from the target base station to the source base station using the determined addressing information.

In accordance with a ninth aspect of the present invention, there is provided a base station for operating in a wireless communication network for re-establishing connections with a mobile terminal as a target base station wherein the mobile terminal has an earlier disrupted connection with a source base station of the mobile communication network, and the source base station containing configuration information associated with the disrupted connection, the target base station being arranged to: receive a connection request from the mobile terminal comprising a cell identifier for a cell served by the source base station, a connected equipment identifier for the mobile terminal, and supplemental cell identifier information, process the connection request to add the supplemental cell identifier information to the cell identifier to provide a more specific identification of the cell served by the source base station, in order to determine more accurate addressing information for the source base station, and send a request for the configuration information from the target base station to the source base station using the determined addressing information.

In accordance with a tenth aspect of the present invention, there is provided a base station for operating in a wireless communication network for re-establishing connections with a mobile terminal as a target base station wherein the mobile terminal has an earlier disrupted connection with a source base station of the mobile communication network, and the source base station containing configuration information associated with the disrupted connection, the target base station being arranged to: receive a connection request from the mobile terminal comprising a cell identifier for a cell served by the source base station, a connected equipment identifier for the mobile terminal, and supplemental routing information for identifying a group of cells including the cell served by the source base station, process the connection request in the target base station to determine addressing information for the source base station using information contained in both the cell identifier and the supplemental routing information, and send a request for the configuration information from the target base station to the source base station using the determined addressing information.

In accordance with an eleventh aspect of the present invention, there is provided a method of operating a target base station in a wireless communication network to re-establish a connection with a mobile terminal, the mobile terminal having an earlier disrupted connection with a source base station of the mobile communication network, and the source base station containing configuration information associated with the disrupted connection, the method comprising: broadcasting, in a serving cell, an indicator from the target base station to indicate to mobile terminals in the serving cell that the base station is capable of receiving a first and a second type of connection re-establishment request, and receiving a connection request from a mobile terminal in the serving cell, and processing the request according to whether it is a first type of request or a second type of request.

An advantage of the target base station being able to process first and second types of connection re-establishment request, is that, the target base station can work with legacy connection re-establishment request types in addition to new re-establishment request types. Preferably, the first type of connection re-establishment request comprises basic cell identity information, and the second type of connection re-establishment request comprises basic cell identity information and additional cell identity information to more reliably determine the addressing information for the source base station. Suitably, the connection re-establishment request is processed to determine addressing information for the source base station.

In an embodiment of the invention, the basic cell identity information is a physical cell identifier (PCI), and the additional cell identity information is at least part of a cell ID (CI), a global cell ID (GCI), or a tracking area code (TAC).

In accordance with a twelfth aspect of the present invention, there is provided a method of operating a mobile terminal to re-establish a connection with a wireless communication network via a target base station, the mobile terminal having an earlier disrupted connection with a source base station of the mobile communication network, and the source base station containing configuration information associated with the disrupted connection, the method comprising: determining if a target base station supports a first type of connection request based on receipt of an indicator from the target base station, sending a first type of connection request if the target base station is determined to support the first type of connection request, and sending a second type of connection request if the target base station is not determined to support the first type of connection request.

In accordance with this aspect of the invention, the first type of connection request can contain additional cell identification information compared to the second type of connection request.

In accordance with a thirteenth aspect of the present invention, there is provided a base station for operating in a wireless communication network for re-establishing connections with a mobile terminal as a target base station wherein the mobile terminal has an earlier disrupted connection with a source base station of the mobile communication network, and the source base station containing configuration information associated with the disrupted connection, the target base station being arranged to: broadcast, in a serving cell, an indicator to indicate to mobile terminals in the serving cell that the base station is capable of receiving a first and a second type of connection re-establishment request, and receive a connection request from a mobile terminal in the serving cell, and processing the request according to whether it is a first type of request or a second type of request.

In accordance with a fourteenth aspect of the present invention, there is provided a base station for operating in a wireless communication network for re-establishing connections with a mobile terminal as a target base station wherein the mobile terminal has an earlier disrupted connection with a source base station of the mobile communication network, and the source base station containing configuration information associated with the disrupted connection, the target base station being arranged to: determine if a target base station supports a first type of connection request based on receipt of an indicator from the target base station, send a first type of connection request if the target base station is determined to support the first type of connection request, and send a second type of connection request if the target base station is not determined to support the first type of connection request.

In accordance with a fifteenth aspect of the present invention, there is provided a method of operating a target base station in a wireless communication network to re-establish a connection with a mobile terminal, the mobile terminal having an earlier disrupted connection with a source base station of the mobile communication network, and the source base station containing configuration information associated with the disrupted connection, the method comprising: receiving a connection request from a mobile terminal, determining from the connection request if the mobile terminal is capable of responding to an information request sent by the target base station, and sending an information request to the mobile terminal if the mobile terminal is determined to be capable of responding.

An advantage with determining if the mobile terminal can respond to an information request, is that, the target base station can work with legacy mobile stations and the possible limitations in the connection re-establishment requests. At the same time, the target base station can support mobile stations capable of providing additional information, such as information to assist with the re-establishment request.

According to one embodiment, the mobile terminal is determined to be capable of responding to an information request if one or more bits in the received connection request indicate that the mobile terminal is capable.

According to another embodiment, the mobile terminal is determined to be capable of responding to an information request if the format of connection request indicates that the mobile is capable.

The method may further comprise receiving a message in response to the information request comprising cell identification information of a cell served by the source base station.

The method may also further comprise determining addressing information for the source base station based on the received cell identification information.

In accordance with a sixteenth aspect of the present invention, there is provided a method of operating a mobile terminal to re-establish a connection with a wireless communication network via a target base station, the mobile terminal having an earlier disrupted connection with a source base station of the mobile communication network, and the source base station containing configuration information associated with the disrupted connection, the method comprising: sending a connection request to the target base station including an indication that the mobile terminal is capable of responding to an information request from the target base station, receiving an information request from the target base station, and responding to the information request by sending further information to the target base station to assist with the connection.

In accordance with a seventeenth aspect of the present invention, there is provided a base station for operating in a wireless communication network for re-establishing connections with a mobile terminal as a target base station wherein the mobile terminal has an earlier disrupted connection with a source base station of the mobile communication network, and the source base station containing configuration information associated with the disrupted connection, the target base station being arranged to: receive a connection request from a mobile terminal, determine from the connection request if the mobile terminal is capable of responding to an information request sent by the target base station, and send an information request to the mobile terminal if the mobile terminal is determined to be capable of responding.

In accordance with a eighteenth aspect of the present invention, there is provided a mobile terminal for operating in a wireless communication network for re-establishing connections with target base stations, the mobile terminal having an earlier disrupted connection with a source base station of the mobile communication network, and the source base station containing configuration information associated with the disrupted connection, the mobile terminal being arranged to: send a connection request to the target base station including an indication that the mobile terminal is capable of responding to an information request from the target base station, receive an information request from the target base station, and respond to the information request by sending further information to the target base station to assist with the connection.

In accordance with a nineteenth aspect of the present invention, there is provided a computer program comprising instructions such that when the computer program is executed on a computing device, the computing device is arranged to carry out any of the preceding methods.

There may be provided a non-transitory computer-readable storage medium storing a computer program as described above.

Further features and advantages of the invention will be apparent from the following description of preferred embodiments of the invention, which are given by way of example only.

Advantageous Effects of Invention

According to the aspects of the present invention, the source base station can be more precisely identified.

BRIEF DESCRIPTION OF DRAWINGS

FIG. 1 is a schematic diagram showing an X2-based Handover mechanism;

FIG. 2 is a schematic diagram showing an S1-based Handover mechanism;

FIG. 3 is a schematic diagram showing an X2-based Re-establishment mechanism;

FIG. 4 is a schematic diagram illustrating an exemplary Re-establishment request message;

FIG. 5 is a schematic diagram illustrating the distribution of three cells in a network;

FIG. 6 is a schematic diagram illustrating a PhysCellId and C-RNTI space;

FIG. 7 is another schematic diagram illustrating a PhysCellId and C-RNTI space;

FIG. 8 is a schematic diagram illustrating a Re-establishment mechanism;

FIG. 9 is another schematic diagram illustrating a Re-establishment mechanism;

FIG. 10 is a flow diagram illustrating part of a Re-establishment procedure;

FIG. 11 is another flow diagram illustrating part of a Re-establishment procedure; and FIG. 12 is a schematic diagram illustrating an typical LTE system;

MODE FOR THE INVENTION

By way of example, embodiments of the invention will now be described in the context of an LTE (Long Term Evolution) cellular wireless communications system operating in accordance with Release-10 and beyond of the LTE system standards. However, it will be understood that this is by way of example only and that other embodiments may involve other wireless systems, operating to other releases and other standards.

A typical LTE cellular wireless communications system is illustrated schematically in FIG. 12. The LTE system comprises a core network, a radio access network, one or more mobile terminals, and ideally an interface to external networks such as the internet or private corporate networks. The radio access network is known as the evolved UMTS terrestrial radio access network (E-UTRAN) in LTE, and handles communications between mobile terminals, known as user equipment (UEs) in LTE, and the core network, known as the evolved packet core (EPC) in LTE.

The E-UTRAN consists of a network of base stations known as evolved Node Bs (eNBs), labelled eNB1 and eNB2 in FIG. 12. Each eNB is a base station that serves and controls UEs in one or more cells. In FIG. 12, eNB1 is the serving eNB for the cell 25 and the UE 10, while eNB2 is the serving eNB for the cell 35. The eNBs can communicate with each other over an optional X2 interface, to the evolved packet core (EPC) via the S1 interface, and to the UEs over the radio interface. The evolved packet core (EPC) includes a mobility management entity (MME) 40, as well as a serving gateway (S-GW) 50 and packet data network gateway (P-GW) 60. The MME 40 handles high-level issues such as security, while the S-GW 50 and P-GW 60 are generally responsible for data traffic, including data to or from external networks.

Embodiments of the invention propose several enhancements related to how a base station (eNB) receiving a re-establishment request can identify the last cell (eNB) that the mobile terminal (UE) was connected to i.e. before a problem situation arose and the re-establishment was triggered.

The following terminology is used in describing embodiments of the invention:

Source cell (SCell): Cell where the UE was before the re-establishment procedure is triggered. Note that a typical example of a trigger would be the occurence of a Radio Link Failure (RLF).

Source eNB (SeNB): eNB handling the UE before the re-establishment procedure is triggered Target cell (TCell): Cell where the UE attempts to re-establish, i.e. in which the UE sends the re-establishment request.

Target eNB (TeNB): eNB receiving the re-establishment request

As explained previously, LTE supports two main mechanisms by which UE mobility in CONNECTED mode is handle, namely:

1) Handover; and
2) Re-establishment

Handover is the normal CONNECTED mode mobility mechanism. The re-establishment procedure is used to recover from several error situations in which the network failed to execute a handover in time.

However, as discussed, the re-establishment procedure has a limitation: the eNB towards which the re-establishment procedure is performed needs to be "prepared" i.e. needs to have received a "UE context" for the concerning UE. Thus, in the current re-establishment mechanism, unless the eNB receiving the re-establishment request is "prepared", the re-establishment will most likely fail.

Handover

FIG. 1 is an example of a Handover mechanism used in LTE in the CONNECTED mode. The handover shown is called an "X2-handover" since messages between the Source-eNB and the Target-eNB are exchanged via the X2 interface. The time axis in FIG. 1 is from top to bottom, with the signalling or message steps between appropriate network elements shown horizontally. Arrows indicate the direction of the signals or messages, and include bi-directional signals and messages. In general, boxes refer to decision or processing steps performed within the system.

Due to the relatively high data rates involved in the CONNECTED state, it is important for the network to carefully manage in which cell the mobile should be communicating at any one time. The network system achieves this by gathering periodic information about the signal strengths within the network, and by making appropriate decisions on handover between cells based on these signal strengths. Specifically, with reference to FIG. 1, the Source-eNB 20 at step 1.1 sends a Measurement Control message to the UE 10. The UE performs signal measurements on the serving cell and its nearest neighbour, and at step 1.2 sends Measurement Reports back to the Source-eNB 20.

A step 1.3, the Source-eNB 20 makes a decision, taking into account the information from the Measurement Reports, to handover the UE to a specified neighbouring cell. In step 1.4, the Source-eNB 20 uses the X2 interface to communicate a handover request to the Target eNB 30 serving the specified neighbouring cell. The handover request asks the new base station to take control of the mobile, and provides all the relevant configuration information related to the current connection so that the new base station is prepared for arrival of the UE.

At step 1.5, the Target-eNB 30 decides which bearers from the existing connection it is willing to accept. The Target-eNB then prepares an RRC Connection Reconfiguration message for the UE, and transmits this as an embedded message in a Handover Request Acknowledgement to the Source-eNB as shown in step 1.6. The Source-eNB in turn extracts the RRC Connection Reconfiguration message, and forwards it to the UE 10 in step 1.7. In response to receiving the RRC Connection Reconfiguration message, the UE detaches from the old cell and synchronises to the new cell. The UE 10 reconfigures itself to the Target eNB in steps 1.9 and 1.10. Once reconfiguration has occurred, the UE can confirm that the connection to the Target eNB is complete with the RRC Connection Reconnfirmation Complete message.

Variations on the above procedure exist depending on the topography of the old and new cells. For example, FIG. 2 illustrates a second handover variant called the "S1-handover". This alternative mechanism is used when the X2 interface is not present between Source-eNB and the Target-eNB. In this procedure, messages are relayed via the Mobility Management Entity (MME) using the S1 interface.

What is important to note about both the X2 and S1 handover sequences is that before the UE comes to the Target-eNB (step 1.9 in the FIG. 1, and step 2.12 in FIG. 2), the Target-eNB is already "prepared" and has received the UE context (step 1.4 in FIG. 1, and step 2.5 in FIG. 2).

Re-Establishment

The re-establishment procedure in LTE was introduced to handle error cases in which the network did not initiate a handover in time to the UE. As a result, the UE goes out of coverage of the existing cell (experiences Radio Link Failure (RLF)) and will attempt to re-establish the connection in another cell.

The sequence for the Re-establishment procedure shares some of the characteristics of the Handover procedure. A significant difference is that there is typically no command from the Source-eNB to the UE to handover (step 1.7 in FIG. 1). Instead, the UE just loses coverage in the source cell. Following a quick cell selection procedure in the UE to determine the appropriate Target cell, entry in the target cell is initiated by a RRC Connection Re-establishment Request message from the UE to the Target-eNB.

The re-establishment procedure will only succeed if the new eNB to which the UE sends the re-establishment message has been "prepared", i.e. has received an up-to-date UE context. This UE context contains information related to, for example, what services the UE is involved in, what transport bearers the UE needs, and what radio configuration is used towards this UE and also contains security information. This information is needed in order to allow any eNB to continue with the UE in CONNECTED mode.

If the initial steps of an incomplete Handover procedure are performed before the UE experiences radio link failure then it is possible that the Target-eNB might have been sent the relevant UE context and would thus be "prepared". However, for the Re-establishment procedure to succeed, the UE should select a target cell, during the Cell Selection procedure, which is served by same Target-eNB previously prepared during the Handover.

Alternatively, a source eNB that detects one of its UEs entered bad radio conditions could quickly trigger a handover preparation, not with the purpose of actually performing a handover, but merely to ensure that, for example, a neighbouring eNB is prepared and can handle a potential re-establishment request.

As discussed previously, it is not straightforward for a Source-eNB to anticipate a radio link failure, and in anticipation prepare other eNBs. For example, it is not known when a Source-eNB should perform such a preparation, or if a single eNB or multiple eNBs should be prepared. Note also that the UE context sent to the potential Target-eNB needs to be up-to-date. In other words, if there is a significant change in the UE context, the previous handover preparation would have to be cancelled and a new one performed.

The specified procedures for Re-establishment in LTE all assume the UE context is pushed to the Target-eNB before the UE attempts the Re-establishment Request message at the Target-eNB. As an alternative, it might be desirable for a Target-eNB to pull the UE context from Source-eNB after the UE attempts the Re-establishment Request message at the Target-eNB.

Referring to FIG. 3, there is shown a proposed sequence for the Re-establishment procedure, in accordance with the invention, that makes use of this type of pull mechanism for the UE context. Although FIG. 3 shows an approach based on the X2 interface, it is also possible for the Re-establishment procedure to be based on an S1-based approach, in which messages 3.5 and 3.6 might be exchanged via the S1-interface.

The following steps are illustrated in FIG. 3:

Step 3.1. The UE sends RRC Connection Re-establishment Request message during a contention based random access procedure;

Step 3.2. In order to make the UE consider the RACH procedure completed, a Contention Resolution Identity MAC CE is transmitted;

Step 3.3 The TeNB performs a first admission control step;

Step 3.4 The TeNB determines the unique identity of the SeNB based on information received during step 3.1;

Step 3.5 The TeNB sends a Context Request message to the SeNB in order to pull the configuration information from the SeNB;

Step 3.6 Upon receiving the Context Request, the SeNB retrieves the relevant UE context/configuration information and sends it in a Context Request Response message back to the TeNB;

Step 3.7 The TeNB can optionally perform a second admission step;

Steps 3.10/3.11: The Re-establishment procedure is completed, which results in radio bearer SRB1 being re-established, and security reactivated without changing the algorithms;

Steps 3.12/3.13: The Reconfiguration procedure to also get SRB2/DRBs up and running. This might also result in release of non-accepted bearers (DRBs/ERABs) at the UE.

Steps 3.20/3.21/3.22/3.23: Path switch procedure. Note that the UL data can already be handled in the TeNB as soon as the DRBs are resumed in the TeNB if the SGW does not change. The DL data can also be handled from that moment, although depending on availability of forwarded data/data from SGW.

Step 3.25: The Re-establishment procedure is effectively complete. Accordingly, the TeNB sends a UE Context Release message to SeNB, confirming that the UE Context no longer needs to be reserved at the SeNB and may be released.

Identifying Source eNB

In order for the context pull mechanism shown in steps 3.5 and 3.6 in FIG. 3 to work robustly, it is important for the TeNB to have accurately identified the SeNB from which the UE originated in step 3.4. However, in step 3.1, the TeNB receives limited information from the UE to help identify the SeNB.

FIG. 4 illustrates the contents of the RRC Connection Re-establishment Request message from the LTE standard Release-10. The message comprises the following 5 fields:

a) a 9-bit physical cell identity (PhyCellId). This is the physical layer identity of the previous cell the UE was connected to.

b) a 16-bit identity of the UE in CONNECTED mode in the source cell (C-RNTI? Cell Radio Network Temporary Identifier).

c) a 16-bit shortMAC-I used for security purposes d) a 2-bit cause value to indicate what caused the re-establishment e.g. handover failure.

e) a 2-bit spare field

The shortMAC-I can help the SeNB to verify that the UE computed a hash over the c-RNTI, PCI and CellIdentity (28 bits, unique in the PLMN). In other words, it provides verification that the UE has the correct security key KRR-Cint. The shortMAC-I serves no function in helping the TeNB to identify the SCell or SeNB.

The PhysCellId is an identification of the source cell. It is 9-bits in size and supports the possibility to distinguish between 503 different cells.

The demands on capacity and increased mobile data rates within wireless networks often leads to increased density of cells within a given area. Furthermore, heterogeneous LTE networks are beginning to evolve which have a plurality of pico cells overlapping with macro cells.

If a re-establishment procedure occurs within a network in which the target cell has neighbouring cells with the same physical cell identity (PhysCellId) then the Target eNB will not be able to precisely identify the Source eNB. Hence, the likelihood of the re-establishment procedure failing is increased.

For example, if the target cell is a large macro cell then it may have upwards of 10,000 neighbouring pico cells. Clearly, some of these neighbouring pico cells would have to share the same PhysCellId. This means the Target-eNB would be unable to uniquely identify the Source eNB based on the PhysCellId alone.

A similar drawback occurs in the Handover mechanism of FIG. 1, where, in step 1.2, the UE reports a measurement for a physCellId of a cell in its neighbourhood. If the Target eNB receiving this measurement report served a macro cell with upwards of 10,000 neighbouring pico cells then it would not know uniquely which of these neighbouring pico cells was the one that was measured.

In Handover, the term "PCI confusion" was used to identify this situation in which the L1 identity (PCI=Physical Cell Identification), which is primarily targetted at providing a cell with a locally unique cell identification in its coverage area, is not uniquely identifying one cell to the eNB receiving the measurement.

An example of this is shown in FIG. 5. Here, cell 1 is the only cell in its local coverage area that is using PCI=89. However, when a UE operating in cell 3 reports a PCI=89 measurement to the eNB of cell 3, then the coverage area of cell 3 becomes relevant. Cell 3 may be a macro-cell with a wide coverage area, and the eNB of cell 3 may be aware of both cell 1 and cell 2 as neighbouring cells. Hence, when the PCI=89 measurement is received by the eNB of cell 3, it cannot know whether it is for cell 1 or cell 3.

In a pico cell, the number of UEs requiring a UE context in parallel might be relatively low. In contrast, the number of pico cells that need to be uniquely identified by a Target eNB in a re-establishment scenario may be relatively high. The signal space allocated in LTE for the PCI and the C-RNTI is fixed at 9-bits and 16-bits respectively. Thus, in accordance with the invention, it has been observed that there may be situations where the information space allocated for the PCI is too small whilst at the same time there is redundancy in the C-RNTI space.

Being a 16-bit space, the C-RNTI can potentially assign up to 65,536 unique identifier values for the UE contexts. A pico cell eNB may require less than 256 unique identifier values for the UE contexts it manages (including active UEs with a RRC connection, as well as UEs for which the context is still stored to handle potential future RLF reporting). Therefore, only 8-bits of the 16-bit C-RNTI space are required. Also, in a macro cell, it is generally unlikely that all 65,536 unique identifiers values for C-RNTI are needed. If, for example, only 32,678 or less UE contexts need to be identified, then only a maximum of 15 of the 16 bits in the C-RNTI space are required.

Based on this observation, in a first solution for addressing the limitations of identifying the Source eNB in a re-establishment procedure, it is possible for one of more bits of the C-RNTI space to be used for a different purpose. In particular, the redundant space in C-RNTI can be used for assisting with identification of the Source eNB in a re-establishment procedure.

The part of the C-RNTI space that is not necessary for UE context identification could be used in a variety of ways to enhance the TeNB possibilities for identifying the SCell and routing messages to the correct SeNB. Two possible ways are explained, as follows, with reference to FIGS. 6 and 7.

A) As Extension for Cell Identification—See FIG. 6

By coordinating the C-RNTI space amongst pico cells, it would be possible to give 256 cells each a unique C-RNTI space for 256 UE's. In other words, each cell (of the 256 cells) is allocated a set of 256 values in the 16-bit space that are unique to that cell.

Referring to FIG. 6, the 8 highest most significant bits of the C-RNTI space are used as an extension of the Physical Cell Identification.

As a specific example, assume that the cell 1 and cell 2 in FIG. 5 have been allocated two different C-RNTI ranges. Cell 1 may be allocated a range of 256 C-RNTI values from 0x0500 to 0x05FF, and cell 2 may be allocated a C-RNTI range of 0x0600 to 0x06FF. Each cell would thereby only be able to establish 256 UE contexts rather than the usual 65,536. Then, if cell 3 receives a re-establishment request from a UE reporting that the previous PCI was 89 and the previous C-RNTI was 0x0628, the eNB of cell 3, being aware of the allocation of C-RNTI values, can conclude that the UE was previously served by cell 2 rather than cell 1, and thus should obtain the UE context from the eNB serving cell 2.

By giving a different C-RNTI space to cells with the same PCI, the combination of PCI and the additional cell identification information from the C-RNTI can effectively provide 504*256=129,024 unique cell identifications. This should be sufficient for identifying any pico cell in a macro cell.

Although, the example above refers to using 8-bits of the C-RNTI for cell identification purposes, it is in theory possible to use other numbers of bits for cell identification purposes. The specific number of bits used may vary depending on how the network is deployed, or how it evolves. Furthermore, it may be possible to allocate multiple ranges of C-RNTI values to a particular cell where the where the number of parallel UE contexts is expected to be higher. Further still, the range of C-RNTI values could be allocated to the different cells in a different manner—for example, the even bits used for the cell identification and the odd bits used for UE context identification.

B) As New Routing Information—See FIG. 7

Alternatively, the bits available from the C-RNTI can be used to contain a new separate information element that would ease the routing in the TeNB (i.e. not be combined with the PCI).

Using a similar 8-bit C-RNTI split from the first example, 8 bits would be available in the C-RNTI to assist with addressing the Source-eNB. The 8 highest most significant bits could be used to identify a pico-cell gateway (GW) or some other group of cells. As long as there is a central entity to route to for that group of cells, and within that group of cells the PCI is unique, still a unique cell identification can be obtained. The exact benefit of this approach depends on the grouping of pico cells to pico-cell gateways. However, the allocation of PCIs within a network could be optimised to account for the pico-cell gateway topography. In any event, the likelihood of two identified Source cells having the same PCI value is decreased with this solution.

Routing might be simpler in this type of approach since less individual identities have to be known in the TeNB. The group identifier could, for example, contain part of the Global eNB-ID. For example, if all pico eNBs under a macro have only the last 8 bits of the Global eNB-ID different (Tracking Area Identity (TAI), and the rest of the Global eNB-ID bits the same), then the macro eNB would only have to store one set of the TAI plus the most significant bits of the eNB-ID and combine this with the 8 bits received to complete the routing information in the context retrieval message.

A benefit of this solution is that there is no requirement to modify existing UEs that comply with the LTE standard. In other words, the splitting of the C-RNTI space amongst different pico cells would be transparent for the UE. According to the Re-establishment procedure shown in FIG. 3, the UE just reports the C-RNTI it was allocated in the previous cell.

The splitting of the C-RNTI space across different cells itself might be coordinated by the network operator (OAM). Furthermore, signalling can be developed to coordinate the allocation of C-RNTI space over the X2 interface, or the S1 interface.

In a second solution for addressing the limitations of identifying the Source eNB in a re-establishment procedure, it has been observed that the 2 spare bits that are currently unused in the Reestablishment Request message can be employed to assist with identifying the Source eNB.

Instead of using part of the C-RNTI space, the remaining 2 bits in the re-establishment request could be used in combination with the Physical Cell Identification to more reliably identify the Source eNB. For example, the 2 bits could be used as an extension of the cell identification or to identify some group of cells in the manner described above.

This solution would avoid the C-RNTI space coordination requirement, but would instead use the last 2 remaining bits in the re-establishment request. Using this solution as an extension of the Physical Cell Id, it would be possible to extend the cell identification space to 4*504=2016 cells at the cost of using the last 2 remaining spare bits.

In a third solution for addressing the limitations of identifying the Source eNB in a re-establishment procedure, it has been observed that the re-establishment request procedure in LTE could be extended to enable messages from the UE that include routing identities such as the cell identifier (CI), Global Cell Identifier (GCI) and/or the Tracking Area Identifier (TAI). Specifically, the radio access network (E-UTRAN) can be adapted to handle a new re-establishment request message. To ensure backwards compatibility, the E-UTRAN can also support existing re-establishment request messages of the type shown in FIG. 4.

In order to support both message types (the existing and extended re-establishment request messages), the network can indicate to UEs that it supports the extended reestablishment request message. Also, the RACH procedure should allow sending of a larger reestablishment request message by the UE. This can be done by configuring the "messageSizeGroupA" parameter and setting it to a value equal to or larger than the size of the contents of the extended re-establishment request message with the extended routing information.

The third solution is illustrated in the steps of the flowchart of FIG. 10.

The extended re-establishment request message could alternatively be a completely new type of re-establishment request message and corresponding procedure. This variation on the third solution is illustrated in the steps of the flowchart of FIG. 11.

Note that it is beneficial to keep the message sizes at an optimal level (not un-necessary large) since increases in message size tend to have an adverse affect on the maximum cell coverage area.

In a fourth solution for addressing the limitations of identifying the Source eNB in a re-establishment procedure, it has been observed that the re-establishment request procedure in LTE could be extended to enable an additional request and response procedure between the Target eNB and UE for obtaining additional information to more precisely identifying the Source eNB.

In order to support both procedures (the existing procedure under LTE, and the extended procedure including the request and response procedure), the Target eNB can be informed by the UE that the UE supports the new request and response mechanism.

Specifically, the Target eNB can be informed of the supported new procedure in the UE by using one of the spare bits in the current RRC Connection Reestablishment Request message (see FIG. 4). Alternatively, the UE can use a new format for the connection reestablishment request message. In this case, the eNB can broadcast support for this type of new connection re-establishment message to inform the UE that it is allowed to use the new message.

If the TeNB recognises that the UE supports the request/reponse mechanism, and it wants to obtain additional information from the UE, it can execute the new request/response mechanism to obtain, for example, Source cell and/or Source eNB identification information. Note that this type of request/response mechanism could also be used for obtaining other information from the UE such as the UE capability information.

FIG. 8 is an example of an extended re-establishment request procedure for obtaining more accurate information on the Source eNB. FIG. 8 follows the procedures of FIG. 3 but includes additional decision box 8.2a, and the request and response messages 8.2b and 8.2c.

In decision box 8.2a, the Target eNB decides if it is able to determine the identity of the Source eNB based on the information received in the Re-establishment request message in step 8.1. If the Target eNB decides it needs additional information, it can check to see if the UE supports an additional request-response procedure. Subsequently, in step 8.2b, the Target eNB sends a new type of request for additional information from the UE. In response, the UE can send additional cell identification information of the Source eNB back to the Target eNB in step 8.2c.

The request-response procedure in FIG. 8 can be a newly specified procedure or it may be based on existing procedures for retrieving additional UE information known from Handover procedures in LTE.

The re-establishment procedure and the subsequent reconfiguration procedure in FIG. 8 could be combined into one procedure which makes all necessary configurations for the UE and thus allows the user traffic (on DRB's) to continue in "one-step".

It should be clear that this type of one-step reestabishment procedure will require a UE context to be present in the TeNB. Thus if in such a solution the TeNB has insufficient information to identify the SCell/SeNB, still a mechanism would be required to obtain this information from the UE. An example sequence is shown in FIG. 9 where the existing UE information procedure is modified to obtain the necessary additional information, followed by a new one-step reestablishment procedure.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method to operate a target base station in a wireless communication network, the method comprising:
   receiving a connection request message from a terminal including a cell identifier for a cell served by a source base station and a connected terminal identifier for the terminal;
   determining addressing information for the source base station using information contained in both the cell identifier and the connected terminal identifier; and
   transmitting a request message for configuration information associated with a connection between the terminal and the source base station to the source base station using the determined addressing information,
   wherein the connected terminal identifier includes first information and second information, the first information is additional information corresponding to the cell identifier for the cell, and the second information is information for identifying the terminal.

2. The method as claimed in claim 1, wherein the first information includes information which can be added to the cell identifier to provide a more specific identification of the cell served by the source base station.

3. The method as claimed in claim 1, wherein the first information includes information identifying a group of cells, wherein the group of cells includes the cell served by the source base station.

4. The method as claimed in claim 3, wherein the addressing information includes routing information to the group of cells.

5. The method as claimed in claim 4, wherein a network entity is associated with the group of cells, and the routing information is for the network entity.

6. The method as claimed in claim 5, wherein the network entity is a pico-cell gateway.

7. The method as claimed in claim 1, wherein the first information includes a first subset of information to assist with uniquely identifying the cell served by the source base station, and the second information includes a second subset of information to assist with uniquely identifying the terminal served by the source base station.

8. The method as claimed in claim 7, wherein the connected terminal identifier is a data field with a predetermined number of bits, and the first subset of information is one or more bits of the data field.

9. The method as claimed in claim 8, wherein the number of bits used for the first subset of information is configured consistently across a plurality of cells.

10. The method as claimed in claim 9, wherein the number of bits is configured over network interfaces connecting multiple base stations.

11. The method as claimed in claim 1, wherein the cell identifier of the source base station is a physical cell identifier (PCI).

12. The method as claimed in claim 1, wherein the connection between the terminal and the source base station is a connection that has experienced a radio link failure.

13. A method to establish a connection between a terminal and a target base station, the method comprising:
  transmitting, by the terminal, a connection request to the target base station, wherein the connection request includes a cell identifier for a cell served by a source base station and a connected terminal identifier for the terminal;
  determining, by the target base station, addressing information for the source base station using information contained in both the cell identifier and the connected terminal identifier; and
  transmitting, by the target base station, a request for configuration information associated with a connection between the terminal and the source base station to the source base station using the determined addressing information,
  wherein the connected terminal identifier includes first information and second information, the first information is additional information corresponding to the cell identifier for the cell, and the second information is information for identifying the terminal.

14. A base station to operate in a wireless communication network, the base station configured to:
  receive a connection request from a terminal including a cell identifier for a cell served by a source base station and a connected terminal identifier for the terminal,
  determine addressing information for the source base station using information contained in both the cell identifier and the connected terminal identifier, and
  transmit a request for configuration information associated with a connection between the terminal and the source base station to the source base station using the determined addressing information,
  wherein the connected terminal identifier includes first information and second information, the first information is additional information corresponding to the cell identifier for the cell, and the second information is information for identifying the terminal.

15. A method to operate a target base station in a wireless communication network, the method comprising:
  receiving a connection request from a terminal including a cell identifier for a cell served by a source base station, a connected terminal identifier for the terminal, and supplemental cell identifier information;
  determining addressing information for the source base station by adding the supplemental cell identifier information to the cell identifier to provide a more specific identification of the cell served by the source base station; and
  transmitting a request for configuration information associated with a connection between the terminal and the source base station to the source base station using the determined addressing information.

16. A method to operate a target base station in a wireless communication network, the method comprising:
  receiving a connection request from a terminal including a cell identifier for a cell served by a source base station, a connected terminal identifier for the terminal, and supplemental routing information to identify a group of cells including the cell served by the source base station;
  determining addressing information for the source base station using information contained in both the cell identifier and the supplemental routing information; and
  transmitting a request for configuration information associated with a connection between the terminal and the source base station to the source base station using the determined addressing information.

17. A method to establish a connection between a terminal and a target base station, the method comprising:
  transmitting, by the terminal, a connection request to the target base station including a cell identifier for a cell served by a source base station, a connected terminal identifier for the terminal, and supplemental cell identifier information,
  determining, by the target base station, addressing information for the source base station by adding the supplemental cell identifier information to the cell identifier to provide a more specific identification of the cell served by the source base station, and
  transmitting, by the target base station, a request for configuration information associated with a connection between the terminal and the source base station to the source base station using the determined addressing information.

18. A method to establish a connection between a terminal and a target base station, the method comprising:
  transmitting, by the terminal, a connection request to the target base station including a cell identifier for a cell served by a source base station, a connected terminal identifier for the terminal, and supplemental routing information to identify a group of cells including the cell served by the source base station,
  determining addressing information for the source base station using information contained in both the cell identifier and the supplemental routing information, and
  transmitting, by the target base station, a request for configuration information associated with a connection between the terminal and the source base station to the source base station using the determined addressing information.

19. A base station to operate in a wireless communication network, the base station configured to:
  receive a connection request from a terminal including a cell identifier for a cell served by a source base station, a connected terminal identifier for the terminal, and supplemental cell identifier information, determine addressing information for the source base station by adding the supplemental cell identifier information to the cell identifier to provide a more specific identification of the cell served by the source base station, and transmit a request for configuration information associated with a connection between the terminal and the source base station to the source base station using the determined addressing information.

20. A base station to operate in a wireless communication network, the base station configured to:

receive a connection request from a terminal including a cell identifier for a cell served by a source base station, a connected terminal identifier for the terminal, and supplemental routing information for identifying a group of cells including the cell served by the source base station, determining addressing information for the source base station using information contained in both the cell identifier and the supplemental routing information, and transmit a request for configuration information associated with a connection between the terminal and the source base station to the source base station using the determined addressing information.

21. A non-transitory computer readable medium comprising a plurality of instructions that, when executed by one or more processors in a computing device, is configured to cause the one or more processors in the computing device to:

receive a connection request from a terminal to a target base station including a cell identifier for a cell served by a source base station and a connected terminal identifier for the terminal;

determine an addressing information for the source base station using information contained in both the cell identifier and the connected terminal identifier; and transmit a request for configuration information associated with a connection between the terminal and the source base station to the source base station using the determined addressing information, wherein the connected terminal identifier includes first information and second information, the first information is additional information corresponding to the cell identifier for the cell, and the second information is information for identifying the terminal.

* * * * *